United States Patent [19]

Betteridge et al.

[11] Patent Number: 5,346,267
[45] Date of Patent: Sep. 13, 1994

[54] LATCH FOR HINGED PANEL

[75] Inventors: Timothy D. Betteridge, Erdington; Adrian K. Lawler, West Midlands, both of England

[73] Assignee: Britax Weathershields Limited, England

[21] Appl. No.: 3,461

[22] Filed: Jan. 12, 1993

[30] Foreign Application Priority Data

Jan. 14, 1992 [GB] United Kingdom ............. 9200665.9

[51] Int. Cl.5 ............................................. E05C 17/32
[52] U.S. Cl. ............................ 292/263; 292/DIG. 5; 292/DIG. 49
[58] Field of Search ........ 292/263, DIG. 5, DIG. 49, 292/274, 278; 49/394

[56] References Cited

U.S. PATENT DOCUMENTS

| 4,086,727 | 5/1978 | Kuyper et al. | 292/DIG. 49 |
| 4,469,370 | 9/1984 | Petersen | 292/263 X |
| 4,484,773 | 11/1984 | Lehne | 292/263 |
| 4,923,232 | 5/1990 | Kawagoe et al. | 292/263 |

FOREIGN PATENT DOCUMENTS

| 205879 | 3/1959 | Australia | 292/DIG. 49 |
| 0049983 | 4/1982 | European Pat. Off. | |

Primary Examiner—Rodney M. Lindsey
Attorney, Agent, or Firm—Davis, Bujold & Streck

[57] ABSTRACT

A hinged panel, mounted in a frame, has a latch comprising a toggle mechanism having a first link connected to the panel by a first pivot pin and a second link connected at one end to the first link by a second pivot pin. At its end opposite to the second pivot pin, the second link has an open-ended slot for receiving a third pivot pin which is mounted on the frame. A resilient retention lever is pivotally mounted on the second link and has a hook-like formation adapted to engage with the third pivot pin to retain it in the slot. At least one part of the periphery of the third pivot pin is flattened for that part of its length which is engaged by the hook-like formation. The retention lever is so arranged that the hook-like formation can disengage from the third pivot pin only by traversing the flattened surface.

2 Claims, 3 Drawing Sheets

LATCH FOR HINGED PANEL

FIELD

This invention relates to a latch for a hinged panel mounted in a frame, the latch being of the type comprising a toggle mechanism having a first link connected to the panel by a first pivot pin, a second link connected to the frame by a second pivot pin and to the first link by a third pivot pin so as to be movable between a closed position in which the two links are aligned in overlapping relationship with each other and an open position in which the two links are held together in aligned end-to-end relationship with each other, the connection of the second link to the second pivot pin comprising an open-ended slot in said second link and a retention lever pivotally mounted on the second link and having a hook-like formation adapted to engage with the third pivot pin to retain it in the slot, the hook-like formation being provided with resilient means for biassing it into a position to inhibit movement out of its engaged position.

RELATED ART

A latch of this type is disclosed in EP-A-0049983. In this known arrangement, the hook-like formation can be manually disengaged when the panel is in its fully open position; there is nothing to prevent inadvertent disengagement. It is an object of the present invention to provide a latch which is not subject to this disadvantage.

SUMMARY OF THE INVENTION

According to the invention, a latch of the foregoing type, is provided with interlock means so arranged that the hook-like formation can disengage from the second pivot pin only when the panel is in an intermediate position between its closed position and its fully open position.

Since the hook-like formation cannot disengage from the second pivot pin when the panel is in its fully open position, the invention has the additional advantage that, when used with a vehicle sunroof the difficulty of effecting disengagement from outside the vehicle is increased. This reduces the risk of forced entry into the vehicle through the sunroof.

In one form of the invention, the second pin has at least one part of its periphery flattened for at least that part of its length which is engaged by the hook-like formation, the retention lever being so arranged that the hook-like formation can disengage only by traversing said flattened surface.

DETAILED DESCRIPTION OF THE PREFERRED EMBODIMENT

Figure 1:
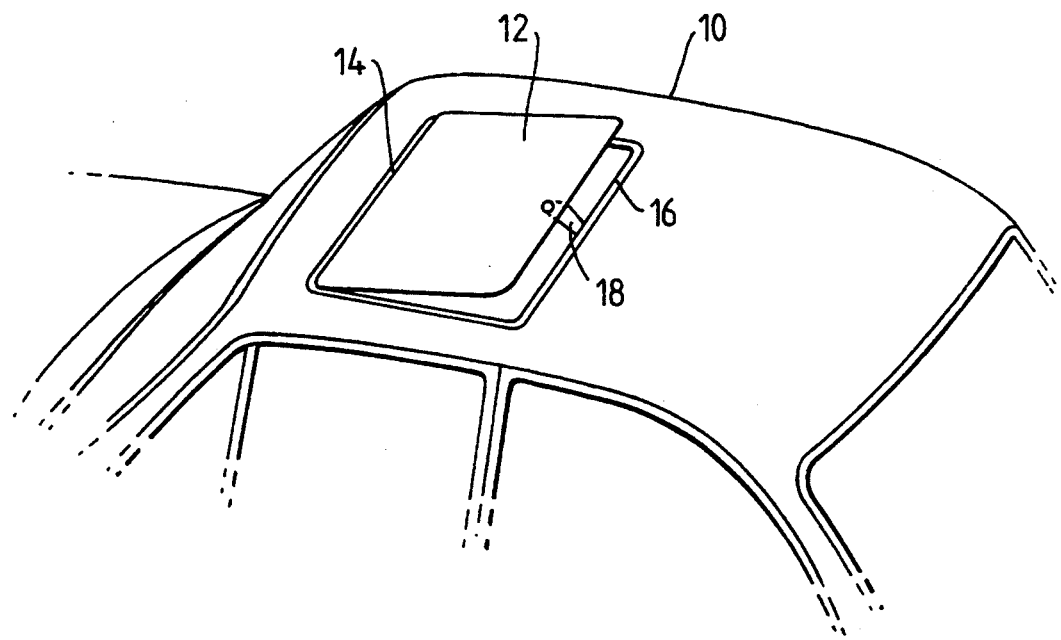
FIG. 1 is a perspective view of the top of the motor car fitted with an opening roof of the type with which a latch in accordance with the invention can be used.

Referring to FIG. 1, a motor car 10 has an opening roof comprising a panel 12 hinged along its leading edge 14 to a frame 16 bounding an aperture in the roof the vehicle 10. The hinges (not shown) are constructed so as to permit the panel 12 to be unhooked after it has been opened well beyond its normal open position (shown in FIG. 1). A latch 18 at the rear of the panel 12 is arranged to hold the panel 12 either in the normal open position as illustrated, or in the fully closed position, and also to allow complete removal of the panel 12.

Figure 2:
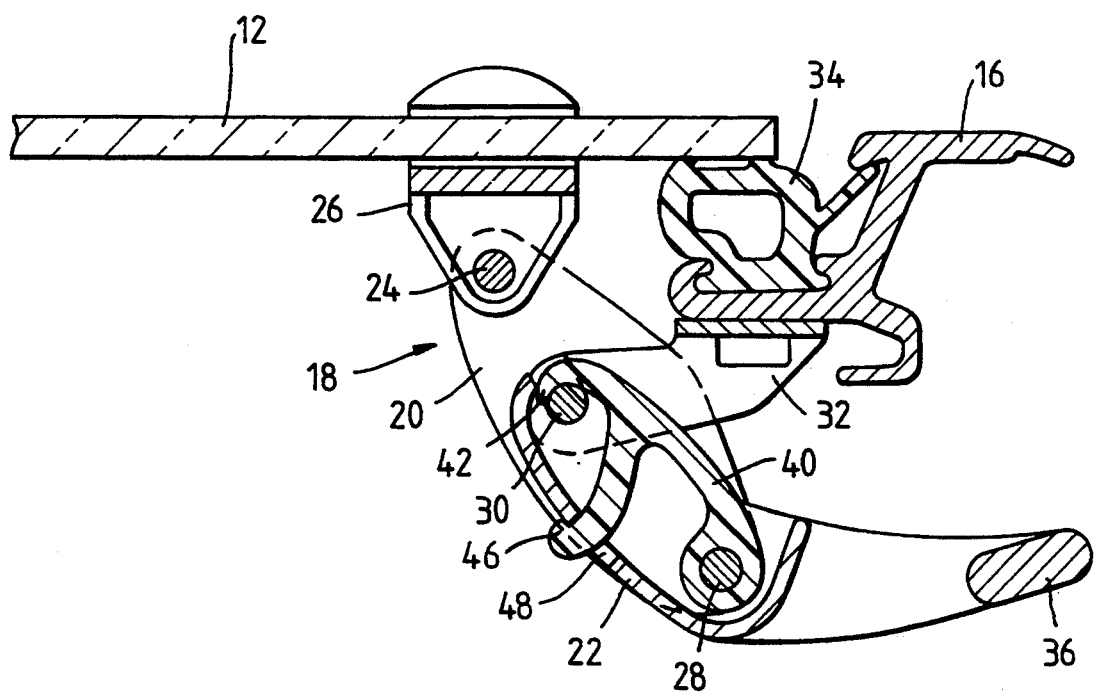
FIG. 2 is a cross-sectional view of a latch in accordance with the invention, fitted to the opening roof illustrated in FIG. 1, the latch being in the closed position.
Figure 3:
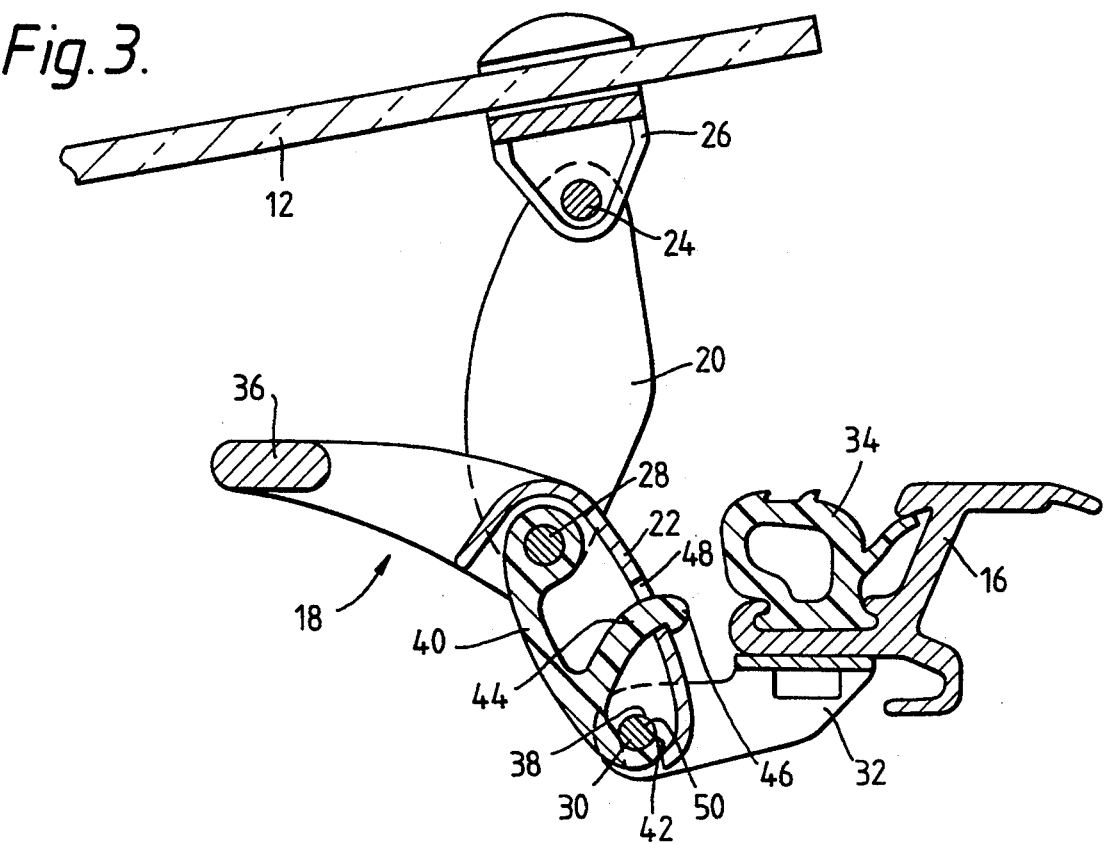
FIG. 3 is a cross-sectional view, similar to FIG. 2, but with the opening roof in its fully open position.

Referring to FIGS. 2 and 3, the latch 18 comprises a first toggle link 20 and a second toggle link 22. The first toggle link is pivotally connected by a first pivot pin 24 to a base member 26 which is attached to the panel 12. The second toggle link 22 is connected by a second pivot pin 28 to the first toggle link 20, and by a third pivot pin 30 to a bracket 32 which is attached to the rear edge of the frame 16. The frame 16 also carries a resilient seal member 34 which, when the panel 12 is in its closed position, urges the latter upwardly and provides the necessary resilience against which the toggle mechanism of the latch 18 goes over centre. The link 22 has an elongated end portion which provides an operating handle 36 for opening and closing the panel 12.

Figure 5:
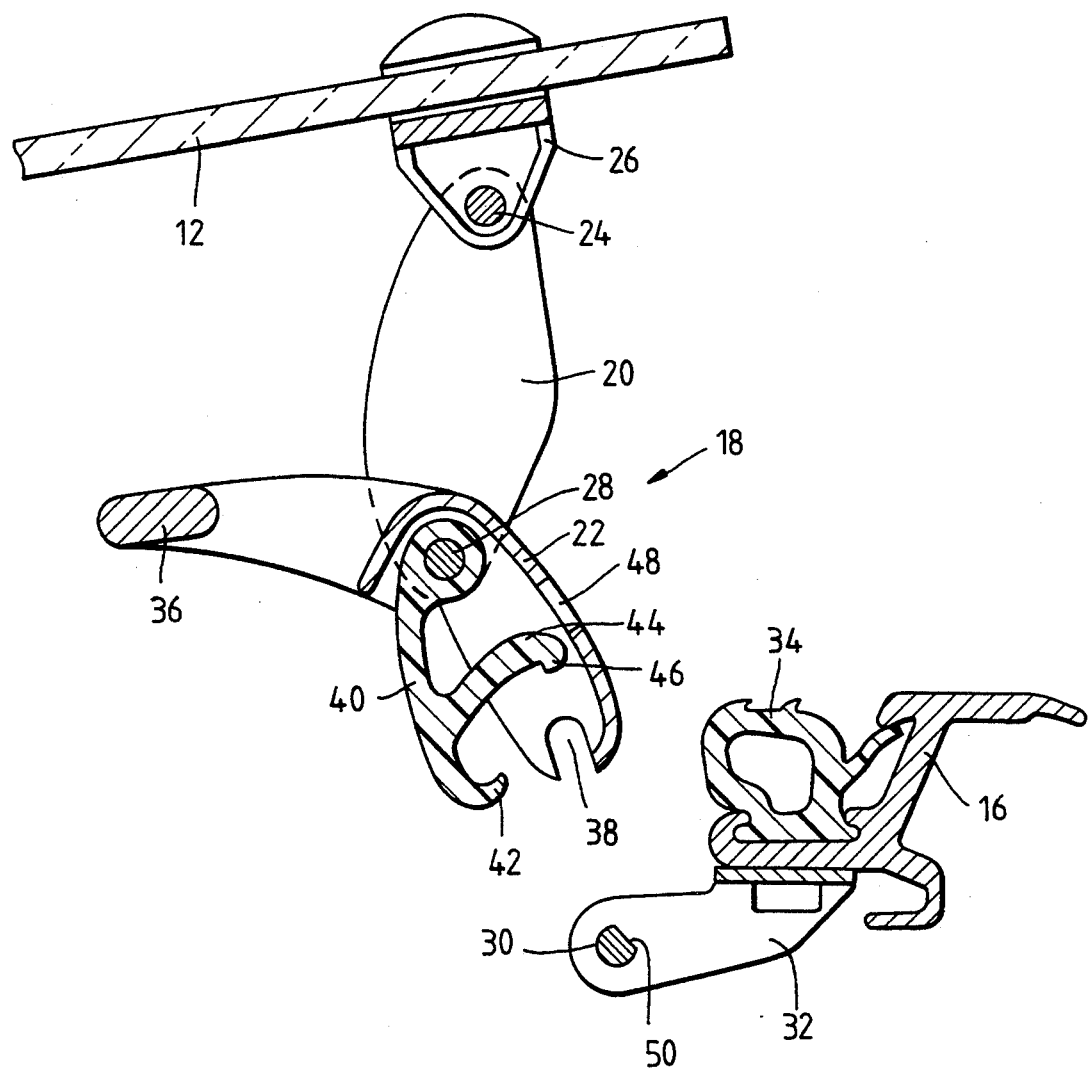
FIG. 5 is a cross-sectional view, similar to FIGS. 2-4, but just after separation of the two parts of the latch from one another.

As can best be seen from FIG. 5, the connection between the second toggle link 22 and the pivot pin 30 comprises an open-ended slot 38. In order to retain the pivot pin 30 in the slot 38, a retention lever 40 is pivotally mounted on the pin 28 and has a first hook-like formation 42 on its free end which engages round the pivot pin 30. The retention lever 40 also has a side arm 44 with a second hook-like formation 46 on its end which projects through an opening 48 in the second toggle link 22, the second hook-like formation 46 engaging with the edge of the opening 48 closest to the slot 38. The retention lever 40 is formed of resilient plastics material which can bend sufficiently to allow the second hook-like formation 46 to be pushed away from the slot 38 and through the opening 48. However, this movement is resisted by engagement of the first hook-like formation 42 on the end of the retention lever 40 with the pivot pin 30.

Figure 4:
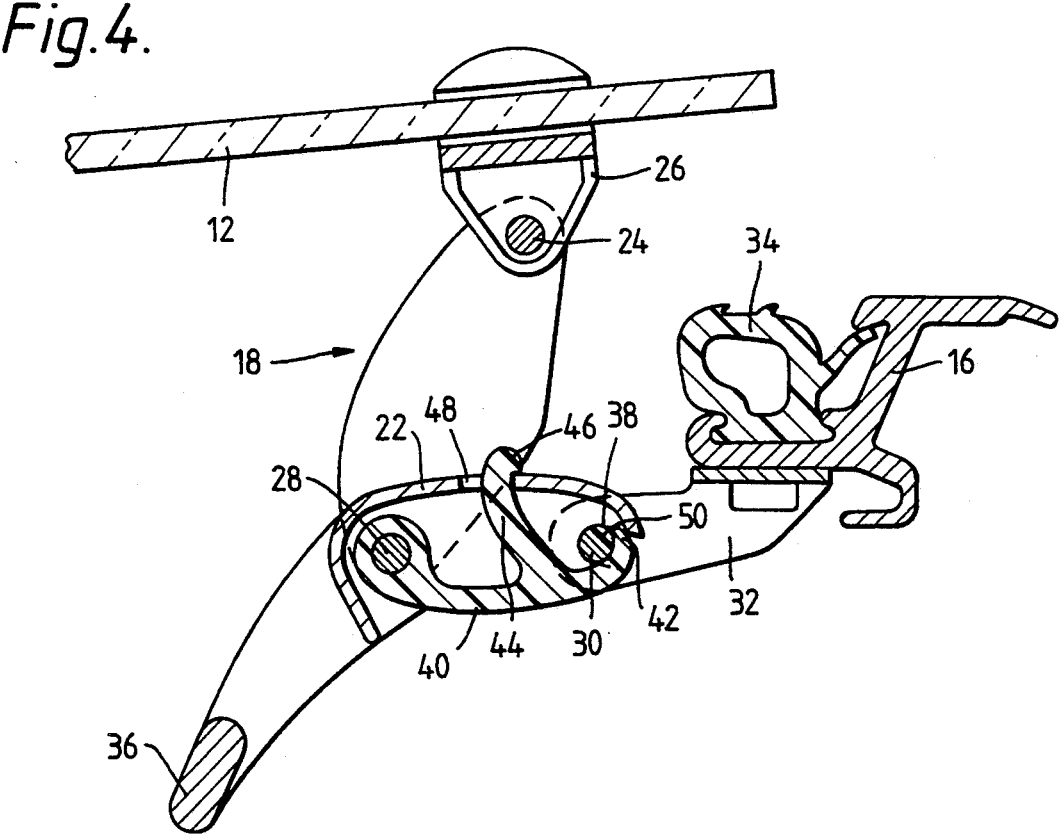
FIG. 4 is a cross-sectional, similar to FIGS. 2 and 3, but with the opening roof in an intermediate position between its closed position and its fully open position, in which the hook-like formation can be disengaged.

In order to allow disengagement when the panel 12 is in the intermediate position shown in FIG. 4, the pivot pin 30 is formed with a flat 50 on the side facing the seal 34. As can be seen in FIG. 4, there is clearance between this flat 50 and the first hook-like formation 42 which is sufficient to allow the retention lever 40 to bend sufficiently for the second hook-like formation 46 to disengage from the edge of the opening 48. The retention lever can then be pivoted round the pivot pin 28 to allow disengagement of the first hook-like formation 42 from the pivot pin 30, thereby freeing the latter to move out of the slot 38, as illustrated in FIG. 5.

Since disengagement of the retention lever 40 can take place only when the panel 12 is in an intermediate position in which it cannot be secured, the chances of inadvertent disengagement are greatly reduced. The consequences of inadvertent disengagement are also reduced because the panel 12 would normally be in the intermediate position shown in FIG. 4 only when a user has hold of the handle 36.

We claim:

1. A latch for a hinged panel mounted in a frame, the latch comprising a toggle mechanism having a first link, a first pivot pin adapted to connect the panel to the first link, a second link having an open-ended slot in one end thereof, a second pivot pin connecting the first link to the second link, a third pivot pin adapted to be mounted on the frame and adapted to engage in said slot, so that the first and second links are movable between a closed position in which the two links are aligned in overlapping relationship with each other and an open position in which the two links are held together in aligned end-to-end relationship with each other, a retention lever pivotally mounted on the second link and having a hook-like formation adapted to engage with the third pivot pin to retain it in the slot, resilient means on the hook-like formation for biassing it into a position to inhibit movement out of its engaged position, and interlock means so arranged that the hook-like formation can disengage from the third pivot pin only when the panel is in an intermediate position between its closed position and its opened position.

2. A latch according to claim 1, wherein the third pivot pin has at least one part of its periphery flattened for at least that part of its length which is engaged by the hook-like formation, the retention lever being so arranged that the hook-like formation can disengage only by traversing said flattened surface.

* * * * *